Figure 1:
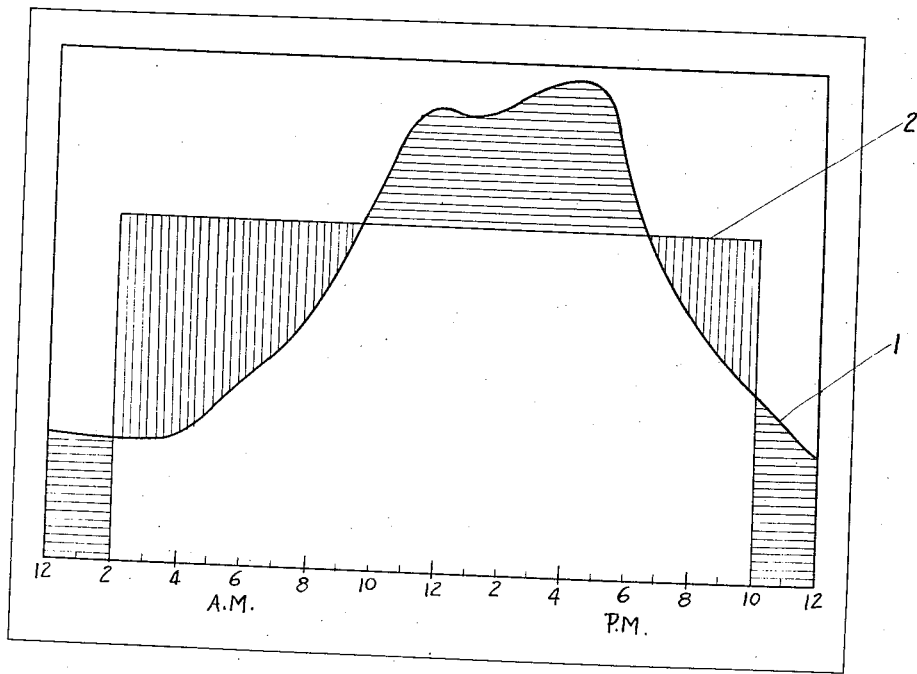

Feb. 5, 1935.  F. T. LEILICH  1,990,081
REFRIGERATING MEANS AND ACCUMULATOR AND SYSTEM OF OPERATING THE SAME
Filed May 20, 1931   2 Sheets-Sheet 1

INVENTOR.
Frank T. Leilich
BY
William W. Varney
ATTORNEY.

Patented Feb. 5, 1935

1,990,081

UNITED STATES PATENT OFFICE 1,990,081

REFRIGERATING MEANS AND ACCUMULATOR AND SYSTEM OF OPERATING THE SAME

Frank T. Leilich, Baltimore, Md., assignor, by mesne assignments, to William W. Varney, Baltimore, Md.

Application May 20, 1931, Serial No. 538,775

4 Claims. (Cl. 62—129)

An object of my invention is the cooling of a body of air or other substance by means of a body of cooled liquid from a storage reservoir at a greater rate of heat exchange than the cooling of said body of liquid by the refrigerating means is obtained.

A further object of my invention is a differential heat exchange whereby for certain periods a large body of liquid is heated faster than the same is being cooled by a refrigerating or other means acting simultaneously.

A further object of my invention is the cooling of a body of air by a body of liquid drawn from a storage thereof, and means for cooling the supply of liquid to said storage.

A further object of my invention is the cooling of a body of air by a body of liquid, whereby the air becomes cooled and the liquid becomes heated, and contemporaneously therewith treating said body of liquid to cool the same, thus forming a differential heat exchange with reference to said body of liquid, the ultimate temperature of said storage depending upon the time element of the heating of said liquid compared with a longer time element involved in the cooling of said liquid.

A further object of my invention is to provide a system whereby the primary machinery necessary for extraction of heat from liquids, solids or gases is reduced below that required for peak demand.

A further object of my invention is the reduction of the cost of the installation, the reduction of the energy costs by the reduction of the demand charge due to the reduced maximum power requirements, the flattening of the power demands and the possibility of eliminating or greatly reducing power demands during industrial peak hours.

A further object of my invention is the design of a system in which the cooling capacity is flexible so as to maintain satisfactory operating conditions under unexpected load demands and during temporary shut downs of the refrigerating machinery.

A further object of my invention is a system that may be used to provide the cooling necessary for an air conditioning system that will result in a lower total investment and operating cost.

In manufacturing processes requiring the chilling of materials a common practice is to provide a refrigerating machine of sufficient capacity to handle the maximum load on the plant when the cooling is by expansion coils which may cool either by direct or indirect contact. However, in most industrial processes and also in air conditioning systems, the load is not constant during the day, but varies according to reasonably definite cycles. In my system, the cold capacity of the machinery is sufficient to supply only a part of the maximum requirements, the balance of the load being furnished by the cold absorbing capacity of the cold stored in solidified or cold liquid, from which the heat is extracted by the refrigerating machinery during times when the cold load is less than the machine capacity.

A further object of my invention is to provide a boosting of the so-called cold obtained from the liquid in a storage supply.

A further object of my invention is a counter flow cooler designed to automatically maintain high rates of heat transfer independent of draft of cold water and so connected as to superimpose on the water actually needed for cooling a maximum booster effect for cooling, thus lowering the thermal lag from what would be required if the storage is cooled independently, and enabling the maintaining of desired conditions over peaks of load.

A further object of my invention is a system for equalizing or spreading out the daily energy charge over long periods and taking advantage of lower power costs and lower connected charge costs and also reducing investment costs for entire installation.

A further object of my invention is a system that provides automatically for unexpected loads and also provides for operation by coasting over periods of breakdown without added cost of spare equipment. This may be very important for hospitals where continuity of service is desired.

A further object of my invention is a system whereby the draft of cold is automatically and economically regulated by a mixing valve which regulates the proportion of chilled liquid to give the desired output conditions. A system that makes it possible to take advantage of the cyclic demand and thus utilize smaller self contained units and a tank to provide conditioning for the average home at a much lower cost than the usual designs.

A further object of my invention is the utilization of the heat exchange and storage herein set forth, in a ventilating system.

A further object of my invention is the utilization of the heat exchange and storage herein set forth in a ventilating system, and automatic control of the heat exchange with reference to said ventilating system.

With the foregoing and other objects in view, my invention consists of the methods employed, combination and arrangement of systems, apparatus and means as hereinafter specifically provided and illustrated in the accompanying drawings wherein is shown a preferred embodiment of my invention, but it is understood that changes, variations and modifications may be resorted to which come within the scope of the claims hereunto appended.

The operation of my system may be explained by reference to Fig. 1 which illustrates one example of the usefulness of my invention, wherein 1 represents the curve of refrigerating load in a process or air conditioning system. In most installations the refrigerating machinery would work at an output corresponding to the load curve and in the case shown, the capacity demands would vary from maximum to approximately 25% of maximum with corresponding variations in the power demand, but with a connected horsepower charge, in the case of purchased power, for the motor capacity required to drive the machinery at maximum output. If, however, the machinery capacity is that represented by 2, the machinery may be operated at a flat load for 20 hours out of the 24, and during the peak hours from 9 a. m. to 5 p. m. the refrigerating load of the system is carried by the machinery with the load above the capacity line 2 carried by the thermal storage part of the system. The machinery capacity is preferably such that the refrigerating machinery may be shut down for a period during the day to permit inspection and servicing. The refrigerating energy represented by the horizontally hatched areas, that is, during the peak hours and shut down period is stored up by operating the machinery at capacity during the off peak hours. The vertically hatched areas represent the stored negative heat and must equal the horizontally hatched areas, plus the energy lost from the thermal storage system. Thus it is possible to operate a cooling system of the type used on many industrial processes and air conditioning systems with refrigerating machinery of considerably below that normally required—for the case shown, the required capacity is about 68%, with all of the advantages previously outlined.

Figure 2:
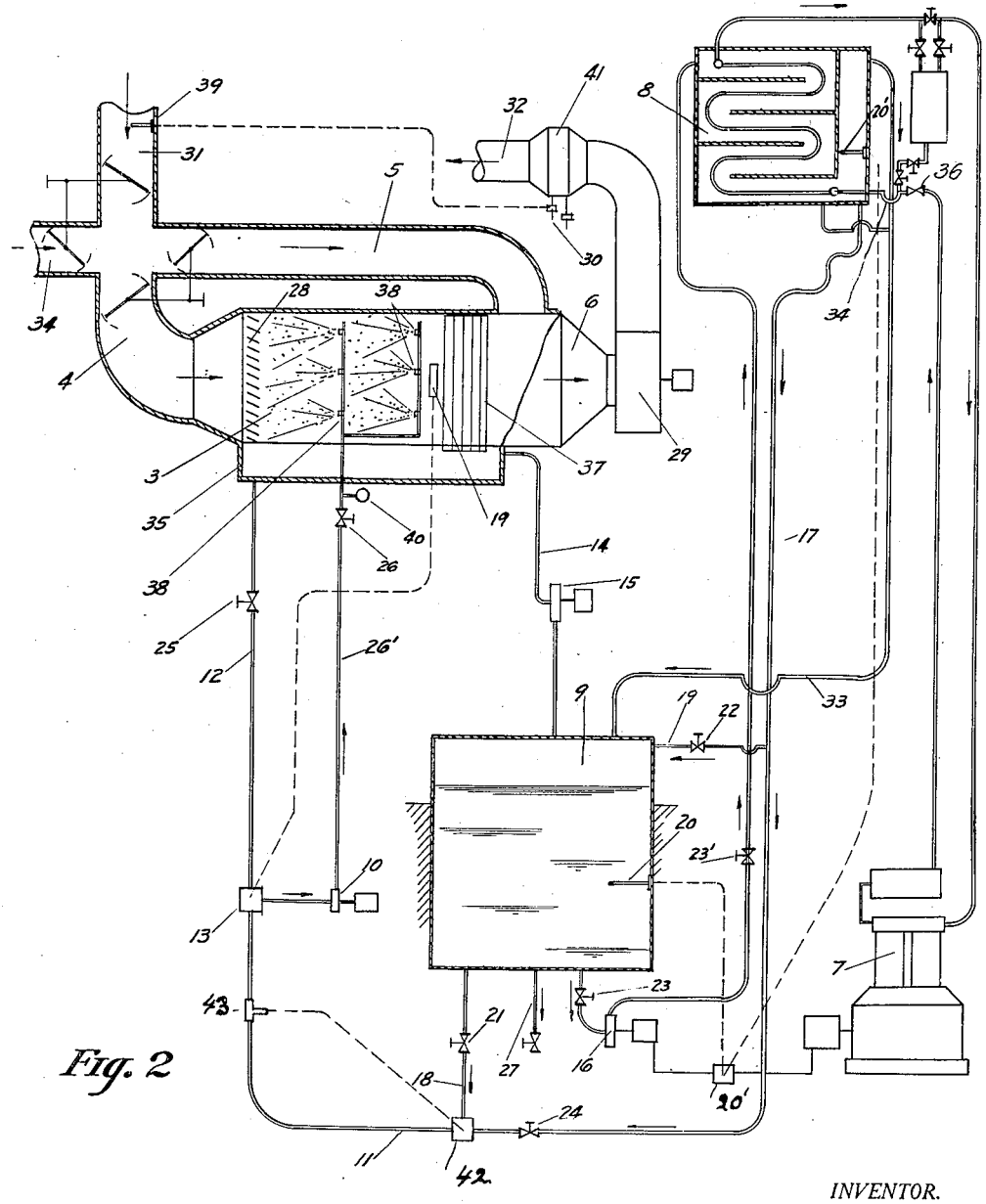

Figure 2 shows diagrammatically one embodiment of my invention as applied to an air cooling and conditioning installation.

3 is the air conditioner, either of the spray, shed or other design; 4 is the duct leading to the conditioner; 5 is a by-pass duct which in some installations is omitted; 6 is the mixing chamber at the discharge end of the conditioner; 7 is the refrigerating or heat pumping machinery complete with condenser, driving motor and auxiliary apparatus. 8 represents an evaporator for the refrigerating fluid, or a cooler, which in this case is a counter flow force circulation apparatus. 9 shows a heat insulated liquid storage tank, 10 is a power driven circulating pump for feeding the sprays 38. 11 shows a pipe line, preferably heat insulated, connecting to the storage tank line 18 and liquid cooler discharge line 17. The line 12 connects to a dew point controlled mixing valve 13 and with the sump tank 35 of the conditioner 3. The mixing valve 13 controls the suction of pump 10. The pipe 14 is the overflow from tank 35 and connects to tank 9, through pump 15 if this pump is required. 16 is the cooler circulating pump. 20 is a thermostatic control operating the starting and stopping of pump 16 and refrigerating machine 7. $20^1$ is an adjustable thermostatic relay which will open the control circuit in the event that the liquid temperature in cooler 8 falls below a safe minimum. Hand valves to control the liquid to and from the storage tank 9 are represented by 21 and 22. Valves 23 and $23^1$ are shut off valves in the suction and discharge of pump 16. Valve 24 is in the cold liquid line from the cooler, valve 25 is in the drain line from sump tank 35. Valve 26 controls the pump discharge in line $26^1$ for regulating the pressure on the sprays 38, this pressure being indicated on gauge 40. The storage tank drain line and valve is represented by 27. 29 shows the fan drawing air through the conditioner and by-pass. The after heater 41 has a control valve 30 which is controlled by the thermal element 39 preferably in the return air duct 31 and thus regulating the temperature of the air discharged to the enclosure through duct 32. The fresh air inlet is shown at 34, preferably with interlocked dampers in ducts 34 and 31. 36 represents an automatic expansion control for the refrigerant. Water is removed from the air leaving 3 by the eliminator plates 37, this air being fed into 3 through the diffuser sheds 28, whereby said air is more uniformly distributed across the spray chamber.

The piping may be such that the storage tank 9 and cooler 8 are connected in parallel, or the cooler may be in the line from the storage tank to the conditioner. For the dual purpose of flexibility of operation and utilization of the booster effect of the cooler when series connected with the storage tank, the piping layout shown illustrates an arrangement whereby the system may be operated either with the parallel or series arrangement, by the operation of the proper valves.

Under certain conditions, it is desirable to have a fluid at a constant temperature above that of the liquid supplied through duct 17 from the cooler 8, and below the temperature of the liquid supplied from storage reservoir 9 through duct 18. This is accomplished by a mixing valve 42 thermostatically controlled by thermostat 43 in discharge pipe 11.

In this specification I have referred to a liquid being stored as a refrigerating liquid. The liquid may be water, which freezes at approximately 32° F., or it may be some other fluid freezing at a much lower temperature. Such latter fluids especially could be used where a source of refrigeration is required in which the liquid is not directly contacted with the heating element; as, for example, where brine is used, or other liquids than water are involved, or even where metal such as mercury may be involved. I do not wish to limit myself to water as illustrated in the example stated.

The cooling means may be any well-known means, such as shown, by the expansion of a gas, or by the evaporation of the so-called dry ice, or even an ice supply.

The operation of my system is as follows:

Assume that the air conditioning system will operate twelve hours out of the twenty-four. Prior to starting the system in daily operation (during the off peak hours) the stored water has been cooled to a pre-determined temperature, let us say in this case 34° F.; further assume that we require air to be conditioned at 55° F. saturation with 52° F. constant temperature water at the conditioner.

To commence operation (parallel circuit) pump 10 is started, drawing water from the storage tank through line 11 and sump tank water through line 12. The relative quantities of water drawn through lines 11 and 12 are governed by the three-way mixing valve 13, which is thermostatically controlled and actuated by a dew point thermostat 19. As the discharge air temperature rises or falls, more or less cold water is admitted through line 11 to mix with the warmer recirculated water through line 12. As water is drawn from storage tank 9, the amount flowing through line 12 is correspondingly reduced and overflows to the storage tank 9 through line 14, or by a float controlled pump 15 if the relative elevations of the sump tank 35 and tank 9 preclude gravity flow. Thus the quantity of water through line 14 is increasing as the water temperature through 11 is likewise increasing. At this point it is well to point out that heat is being added to the stored water at a faster rate than it is absorbed by the cooler.

As the temperature of the stored water increases, a thermal element 20 automatically closes the interlocked electrical circuit between pump 16 and refrigerating machine 7. Water is drawn by pump 16 from the storage tank 9 and forced into the cooler chamber 8 where its temperature is reduced. The cooler water is drained through line 17 and discharged through pipe 18 into storage tank 9. The heat pump 7 and pump 16 will continue to run after the air conditioner is out of service, until the water in the storage tank is cooled to a predetermined temperature, say 34°, when the thermal element 20 will shut down pump 16 and refrigerating machine 7.

To operate the system with the cooler in series with the storage tank as a means of utilizing the booster effect, close valves 21 and 22 and open valves 23, 24, 25 and 26. Beginning at pump 10 water is drawn through lines 11 and 12 and pumped into the spray chamber 28, where the amount of water in addition to the quantity recirculated is drawn through line 14 and discharged into the storage tank 9, thence by pump 16 into the cooler 8 and through line 17 and line 11 to pump 10.

Pump 16 should preferably be of sufficient capacity to circulate the cooling liquid through the cooler at a high enough velocity to insure a high rate of heat transfer through the cooling coils. The capacity of pump 16 will normally be considerably greater than pump 10, in which case the excess of liquid pumped over that drawn off will return to storage through pipe 33. The connection 34 is a relatively small bleeder line which insures draining of the cooler in event the apparatus is shut down with valves 22 and 24 closed.

Conditioner 3 may be operated as an evaporative cooler by by-passing the water storage tank 9 and the refrigerating machine 7 and cooler 8. This may also be used as one means of changing the relative humidity of the air entering fan 29 with or without changing its temperature, by varying the relative amounts of cold water from the pump 10; this, however, involves changing the percentage of air by-passed, as the air from the spray machine will be substantially constant in its relative humidity.

Interlocking controls are preferably arranged so that the refrigerating machine 7 cannot be started unless pump 16 is running, and also so arranged that pump 16 will not stop unless the refrigerating machine 7 is stopped. This is to prevent freezing and to insure circulation. The pump 16 should be of sufficient capacity to give requisite velocities over the expansion coils in cooling chamber 8. Cooling chamber 8 is preferably slightly tapered to minimize the damage in case of freezing, and is provided with a safety cut-out in the same so that refrigerating machine 7 is shut off when the temperature in the cooling chamber 8 falls to a predetermined point, say 33° F.

Having thus described my invention, what I claim and desire to secure by Letters Patent is:

1. A system of liquid heating comprising drawing from a large body of liquid to be heated a portion, cooling said portion of said liquid so withdrawn from said large body, then mixing said cooled portion with another portion withdrawn from said large body of said liquid while controlling the relative mixture thus produced to modify the temperature thereof, then heating said two mixed portions above the temperature of said large body of said liquid.

2. In a refrigerating system, a source of limited output of refrigeration, a liquid heat transfer medium, a storage capacity for said medium whereby a demand for refrigeration may be supplied from said storage in excess of the supply from the said source of refrigeration at its limit of output, and means for controlling the amount of said liquid from said source of refrigeration with reference to the amount of said liquid from said storage and with reference to said demand whereby a lower temperature of said medium may be obtained than that from the liquid in said storage.

3. An apparatus for conditioning air comprising an air conditioner, a source of refrigeration, a storage for refrigerating liquid, means for supplying liquid to said air conditioner from said storage, said source of refrigeration and said air conditioner, the liquid so supplied to the air conditioner comprising liquid, for refrigerating means, which is below the temperature required and the liquid, from the storage means, which is below the temperature required, and recirculated liquid to regulate the temperature of the whole whereby a mixture of the temperatures desired is obtained.

4. In a refrigerating plant, means for the storage of refrigerated fluid, means for cooling said refrigerated fluid, means for heating said refrigerated fluid, means for drawing said refrigerated fluid from said cooling means while said cooling means is cooling the refrigerated fluid in said storage means, thus by-passing said storage means by the withdrawn fluid, and means for returning said fluid to said storage after having been heated by said heating means.

FRANK T. LEILICH.